(12) United States Patent
Wang et al.

(10) Patent No.: US 10,412,345 B2
(45) Date of Patent: Sep. 10, 2019

(54) VIDEO SURVEILLANCE METHOD, APPARATUS AND SYSTEM

(71) Applicant: Huawei Technologies Co., Ltd., Shenzhen (CN)

(72) Inventors: Hanlin Wang, Hangzhou (CN); Feng Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 537 days.

(21) Appl. No.: 14/943,468

(22) Filed: Nov. 17, 2015

(65) Prior Publication Data

US 2016/0080703 A1 Mar. 17, 2016

Related U.S. Application Data

(63) Continuation of application No. PCT/CN2014/077115, filed on May 9, 2014.

(30) Foreign Application Priority Data

May 28, 2013 (CN) .......................... 2013 1 0203846

(51) Int. Cl.
*H04N 7/18* (2006.01)
*G08B 13/196* (2006.01)
*G06K 9/00* (2006.01)

(52) U.S. Cl.
CPC ......... *H04N 7/183* (2013.01); *G06K 9/00771* (2013.01); *G08B 13/19608* (2013.01); *G08B 13/19678* (2013.01)

(58) Field of Classification Search
CPC ........ G08B 13/19608; G08B 13/19678; H04N 7/183
See application file for complete search history.

(56) References Cited

U.S. PATENT DOCUMENTS

2004/0227817 A1* 11/2004 Oya ........................ G06F 3/017
 348/155
2005/0104958 A1* 5/2005 Egnal .................... G01S 3/7864
 348/143
(Continued)

FOREIGN PATENT DOCUMENTS

CN 101123722 A 2/2008
CN 101753999 A 6/2010
(Continued)

OTHER PUBLICATIONS

Foreign Communication From a Counterpart Application, Korean Application No. 10-2015-7032449, Korean Office Action dated Nov. 3, 2016, 6 pages.
(Continued)

*Primary Examiner* — Anand S Rao
*Assistant Examiner* — Tyler B Edwards
(74) *Attorney, Agent, or Firm* — Conley Rose, P.C.

(57) ABSTRACT

Related to the field of security protection, a video surveillance method, apparatus, and system, which can implement local magnification of a moving object in a surveillance scene. The method includes obtaining, by a client, an intelligent analysis alarm and moving track information of at least one alarm triggering object, and adjusting a window layout of a user interface according to the intelligent analysis alarm, where the intelligent analysis alarm is triggered by the client, a surveillance platform, or a camera when determining that there is an intrusion object in a surveillance scene according to an intelligent analysis strategy; and performing, by the client, local magnification on the at least one alarm triggering object according to moving track information of the at least one alarm triggering object. The present disclosure is applicable to video surveillance of important places.

20 Claims, 4 Drawing Sheets

(56) References Cited

U.S. PATENT DOCUMENTS

| | | | |
|---|---|---|---|
| 2007/0039030 A1* | 2/2007 | Romanowich | G08B 13/19608 725/105 |
| 2007/0075857 A1* | 4/2007 | Chang | G08B 13/1968 340/541 |
| 2009/0110058 A1* | 4/2009 | Shen | G08B 13/19608 375/240.01 |
| 2010/0013917 A1* | 1/2010 | Hanna | G06K 9/00771 348/143 |
| 2010/0141772 A1* | 6/2010 | Inaguma | G01S 3/7864 348/169 |
| 2011/0228092 A1* | 9/2011 | Park | G06K 9/00771 348/154 |
| 2015/0116504 A1 | 4/2015 | Inaguma et al. | |

FOREIGN PATENT DOCUMENTS

| | | |
|---|---|---|
| CN | 102291569 A | 12/2011 |
| EP | 1696398 A2 | 8/2006 |
| JP | 2004248090 A | 9/2004 |
| JP | 2006245649 A | 9/2006 |
| JP | 2010136099 A | 6/2010 |
| JP | 2012129689 A | 7/2012 |
| KR | 200900116215 A | 11/2009 |

OTHER PUBLICATIONS

Foreign Communication From a Counterpart Application, Korean Application No. 10-2015-7032449, English Translation of Korean Office Action dated Nov. 15, 2016, 8 pages.

Foreign Communication From a Counterpart Application, European Application No. 14803365.7, Extended European Search Report dated Apr. 26, 2016, 8 pages.

Partial English Translation and Abstract of Chinese Patent Application No. CN101123722, Oct. 13, 2015, 9 pages.

Foreign Communication From a Counterpart Application, PCT Application No. PCT/CN2014/077115, English Translation of International Search Report dated Aug. 4, 2014, 2 pages.

Foreign Communication From a Counterpart Application, PCT Application No. PCT/CN2014/077115, English Translation of Written Opinion dated Aug. 4, 2014, 15 pages.

Partial English Translation and Abstract of Japanese Patent Application No. JP2004248090, Sep. 2, 2004, 20 pages.

Partial English Translation and Abstract of Japanese Patent Application No. JP2006245649, Sep. 14, 2006, 53 pages.

Partial English Translation and Abstract of Japanese Patent Application No. JP2010136099, Jun. 17, 2010, 32 pages.

Partial English Translation and Abstract of Japanese Patent Application No. JP2012129689, Jul. 5, 2012, 24 pages.

Foreign Communication From a Counterpart Application, Japanese Application No. 2016-515623, Japanese Office Action dated Jan. 10, 2017, 5 pages.

Foreign Communication From a Counterpart Application, Japanese Application No. 2016-515623, English Translation of Japanese Office Action dated Jan. 10, 2017, 7 page.

Foreign Communication From a Counterpart Application, Chinese Application No. 201310203846.0, Chinese Office Action dated Aug. 22, 2017, 11 pages.

* cited by examiner

```
┌─────────────────────────────────────────────────────────┐
│ When determining that there is an intrusion object in a │
│ surveillance scene according to an intelligent analysis │
│ strategy configured by a user, a surveillance platform  │──201
│ triggers an intelligent analysis alarm, and records     │
│ moving track information of at least one alarm          │
│ triggering object                                       │
└─────────────────────────────────────────────────────────┘
                            │
                            ▼
┌─────────────────────────────────────────────────────────┐
│ The surveillance platform sends the intelligent analysis│
│ alarm and the moving track information of the at least  │
│ one alarm triggering object to a client, so that the    │
│ client adjusts a window layout of a user interface      │──202
│ according to the intelligent analysis alarm and performs│
│ local magnification on the at least one alarm triggering│
│ object according to moving track information of the at  │
│ least one alarm triggering object                       │
└─────────────────────────────────────────────────────────┘
```

VIDEO SURVEILLANCE METHOD, APPARATUS AND SYSTEM

CROSS-REFERENCE TO RELATED APPLICATIONS

This application is a continuation of International Application No. PCT/CN2014/077115, filed on May 9, 2014, which claims priority to Chinese Patent Application No. 201310203846.0, filed on May 28, 2013, both of which are hereby incorporated by reference in their entireties.

TECHNICAL FIELD

The present disclosure relates to the field of security protection, and in particular, to a video surveillance method, apparatus, and system.

BACKGROUND

In recent years, to improve security of some important places (such as airports), a video surveillance system is usually deployed to perform surveillance on these important places. A typical video surveillance system includes a surveillance client, a surveillance platform, and a camera, where the surveillance client is a graphical user interface and can implement interaction with a user; the surveillance platform is a background service component and can complete surveillance-related service functions, such as real-time browsing and intelligent analysis; and the camera is a front-end video capture device and is used to capture and analyze a real-time image of a current place. The video surveillance system configures an intelligent analysis rule for perimeter intrusion, and generates an alarm with respect to a moving object that intrudes into a pre-configured perimeter range, to prompt a user to handle the intrusion. For a large-range surveillance scene in which a moving object occupies a small proportion of the picture and details cannot be seen clearly, a multi-target tracking system is used in the prior art (that is, a fixed box camera and a high-speed pan-tilt-zoom (PTZ) camera are deployed; once the box camera captures an alarm picture, the box camera is linked to the PTZ camera immediately, and uses the PTZ camera to perform short-distance tracking of the moving object) to implement local magnification of the moving object.

However, during implementation of the foregoing video surveillance, two cameras need to be deployed to implement multi-target tracking, causing high deployment costs and relatively heavy workload of installation and commissioning. In addition, only analog cameras can be deployed as the box camera and the PTZ camera in the multi-target tracking system, and network cameras cannot implement multi-target tracking, and therefore cannot implement local magnification of the moving object.

SUMMARY

Embodiments of the present disclosure provide a video surveillance method, apparatus, and system, which can implement local magnification of a moving object in a surveillance scene.

To achieve the foregoing object, the embodiments of the present disclosure provide the following technological solutions.

According to a first aspect, a video surveillance method is provided, where the method includes obtaining, by a client, an intelligent analysis alarm and moving track information of at least one alarm triggering object, and adjusting a window layout of a user interface according to the intelligent analysis alarm, where the intelligent analysis alarm is triggered by the client, a surveillance platform, or a camera when determining that there is an intrusion object in a surveillance scene according to an intelligent analysis strategy; and performing, by the client, local magnification on the at least one alarm triggering object according to moving track information of the at least one alarm triggering object.

With reference to the first aspect, in a first possible implementation manner, the method further includes continuously obtaining, by the client, the moving track information of the at least one alarm triggering object after the at least one alarm triggering object moves; and performing, by the client, local magnification on the at least one alarm triggering object according to the moving track information of the at least one alarm triggering object, such that the at least one alarm triggering object is always displayed in the center of a video picture of a corresponding window in the user interface.

With reference to the first possible implementation manner of the first aspect, in a second possible implementation manner, performing, by the client, local magnification on the at least one alarm triggering object according to moving track information of the at least one alarm triggering object includes obtaining, by the client, position information of the at least one alarm triggering object from the moving track information of the at least one alarm triggering object; obtaining, by the client, a current real-time image, and matching the real-time image with the position information of the at least one alarm triggering object, to find a position of the at least one alarm triggering object in the real-time image; and performing, by the client, local magnification on the at least one alarm triggering object using the position of the at least one alarm triggering object in the real-time image as a center.

With reference to the first aspect, in a third possible implementation manner of the first aspect, when the intelligent analysis alarm is triggered by the client when determining that there is an intrusion object in the surveillance scene according to the intelligent analysis strategy, obtaining, by a client, an intelligent analysis alarm and moving track information of at least one alarm triggering object, and adjusting a window layout of a user interface according to the intelligent analysis alarm includes triggering, by the client, the intelligent analysis alarm when determining that there is an intrusion object in the surveillance scene according to an intelligent analysis strategy configured by a user, and recording the moving track information of the at least one alarm triggering object; and adjusting, by the client, the window layout of the user interface according to the intelligent analysis alarm.

With reference to the first aspect, in a fourth possible implementation manner of the first aspect, when the intelligent analysis alarm is triggered by the surveillance platform when determining that there is an intrusion object in the surveillance scene according to the intelligent analysis strategy, obtaining, by a client, an intelligent analysis alarm and moving track information of at least one alarm triggering object, and adjusting a window layout of a user interface according to the intelligent analysis alarm includes receiving, by the client, the intelligent analysis alarm that is reported by the surveillance platform when determining that there is an intrusion object in the surveillance scene according to an intelligent analysis strategy configured by a user; receiving, by the client, the moving track information of the at least one alarm triggering object that is obtained by the surveillance platform after generating the intelligent analysis alarm; and adjusting, by the client, the window layout of the user interface according to the intelligent analysis alarm.

According to a second aspect, a client is provided, where the client includes an information obtaining module configured to obtain an intelligent analysis alarm and moving track information of at least one alarm triggering object, where the intelligent analysis alarm is triggered by the client, a surveillance platform, or a camera when determining that there is an intrusion object in a surveillance scene according to an intelligent analysis strategy; an interface adjusting module configured to adjust a window layout of a user interface according to the intelligent analysis alarm obtained by the information obtaining module; and a local magnification module configured to perform local magnification on the at least one alarm triggering object according to moving track information of the at least one alarm triggering object that is obtained by the information obtaining module.

With reference to the second aspect, in a first possible implementation manner, the information obtaining module is further configured to continuously obtain the moving track information of the at least one alarm triggering object after the at least one alarm triggering object moves; and the local magnification module is further configured to perform local magnification on the at least one alarm triggering object according to the moving track information of the at least one alarm triggering object that is obtained by the information obtaining module, such that the at least one alarm triggering object is always displayed in the center of a video picture of a corresponding window in the user interface.

With reference to the first possible implementation manner of the second aspect, in a second possible implementation manner of the second aspect, the local magnification module includes an information obtaining unit configured to obtain position information of the at least one alarm triggering object from the moving track information of the at least one alarm triggering object, where the information obtaining unit is further configured to obtain a current real-time image, and match the real-time image with the position information of the at least one alarm triggering object, to find a position of the at least one alarm triggering object in the real-time image; and wherein a local magnification unit is configured to perform local magnification on the at least one alarm triggering object using the position of the at least one alarm triggering object in the real-time image as a center.

With reference to the second aspect, in a third possible implementation manner of the second aspect, when the intelligent analysis alarm is triggered by the client when determining that there is an intrusion object in the surveillance scene according to the intelligent analysis strategy, the information obtaining module is configured to, when it is determined that there is an intrusion object in the surveillance scene according to an intelligent analysis strategy configured by a user, trigger the intelligent analysis alarm and record the moving track information of the at least one alarm triggering object, such that the interface adjusting module adjusts the window layout of the user interface according to the intelligent analysis alarm.

With reference to the second aspect, in a fourth possible implementation manner of the second aspect, when the intelligent analysis alarm is triggered by the surveillance platform when determining that there is an intrusion object in the surveillance scene according to the intelligent analysis strategy, the information obtaining module is configured to receive the intelligent analysis alarm that is reported by the surveillance platform when determining that there is an intrusion object in the surveillance scene according to an intelligent analysis strategy configured by a user; and receive the moving track information of the at least one alarm triggering object that is obtained by the surveillance platform after generating the intelligent analysis alarm, such that the interface adjusting module adjusts the window layout of the user interface according to the intelligent analysis alarm.

According to a third aspect, a video surveillance system is provided, where the video surveillance system includes a surveillance platform; a camera; and a client comprising: a first information obtaining module configured to obtain an intelligent analysis alarm and moving track information of at least one alarm triggering object, wherein the intelligent analysis alarm is triggered by at least one of the client, the surveillance platform, and the camera when determining that there is an intrusion object in a surveillance scene according to an intelligent analysis strategy; an interface adjusting module configured to adjust a window layout of a user interface according to the intelligent analysis alarm obtained by the first information obtaining module; and a local magnification module configured to perform local magnification on the at least one alarm triggering object according to moving track information of the at least one alarm triggering object that is obtained by the first information obtaining module, wherein the surveillance platform comprises: a second information obtaining module configured to: trigger the intelligent analysis alarm when it is determined that there is an intrusion object in the surveillance scene according to the intelligent analysis strategy configured by the user; and record moving track information of at least one alarm triggering object when it is determined that there is an intrusion object in the surveillance scene according to the intelligent analysis strategy configured by the user; and an information sending module configured to send, to the client, the intelligent analysis alarm and the moving track information of the at least one alarm triggering object that are obtained by the second information obtaining module, such that the client adjusts the window layout of the user interface according to the intelligent analysis alarm and performs local magnification on the at least one alarm triggering object according to moving track information of the at least one alarm triggering object.

Embodiments of the present disclosure provide a video surveillance method, apparatus, and system. A client obtains an intelligent analysis alarm and moving track information of at least one alarm triggering object, and adjusts a window layout of a user interface according to the intelligent analysis alarm, where the intelligent analysis alarm is triggered by the client, a surveillance platform, or a camera when determining that there is an intrusion object in a surveillance scene according to an intelligent analysis strategy; and performs local magnification on the at least one alarm triggering object according to moving track information of the at least one alarm triggering object. In the present disclosure, only one camera needs to be deployed, thereby avoiding cost waste caused by deploying two cameras, and improving efficiency of local magnification on an alarm triggering object.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
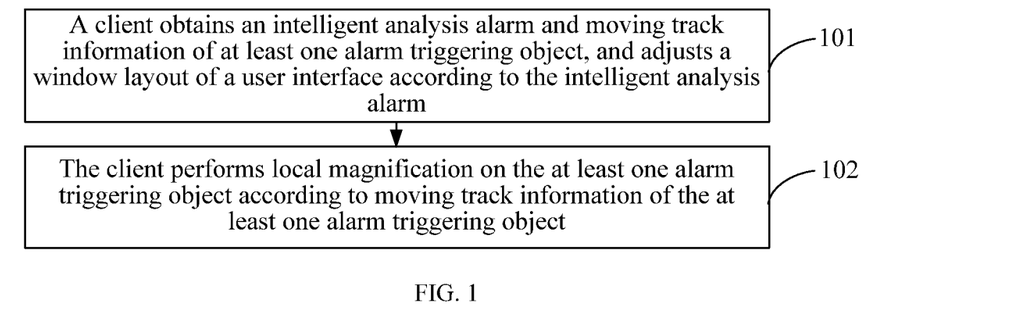
FIG. 1 is a schematic flowchart of a video surveillance method on a client side according to an embodiment of the present disclosure.
Figure 2:
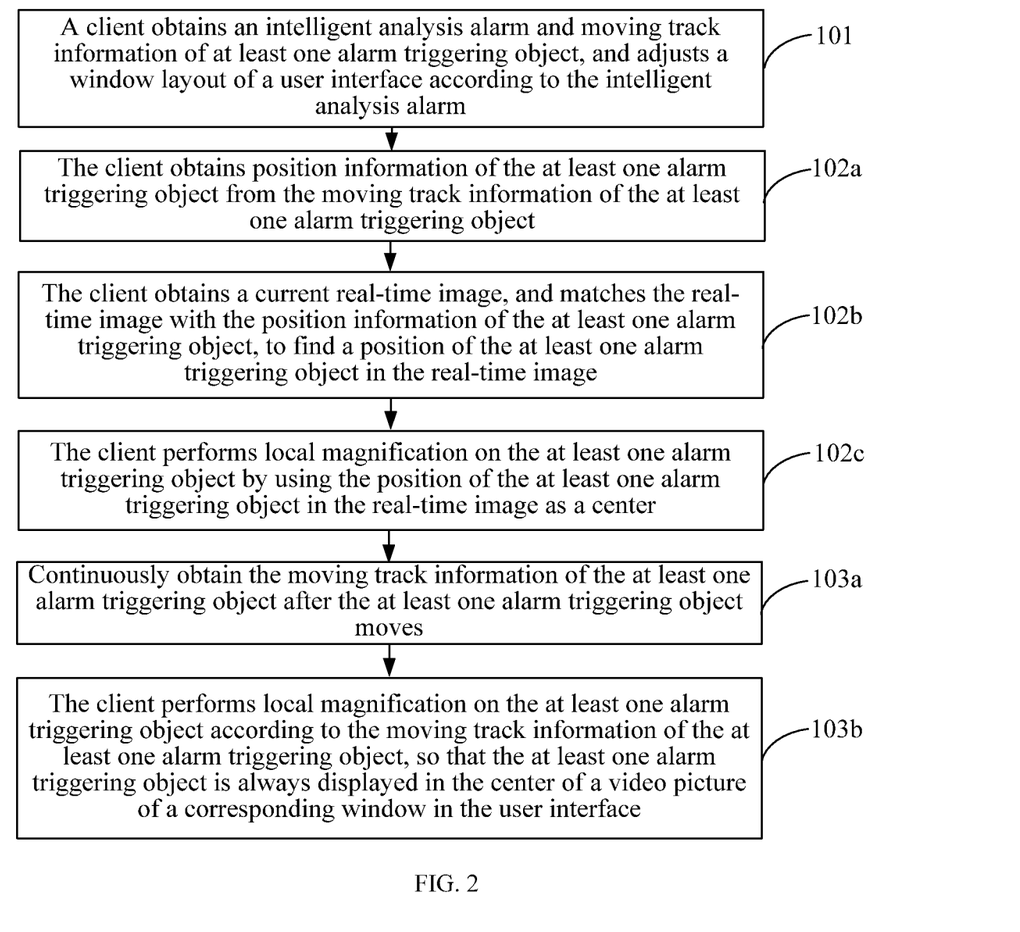
FIG. 2 is a schematic flowchart of another video surveillance method on a client side according to an embodiment of the present disclosure.

An embodiment of the present disclosure provides a video surveillance method, which may be implemented by a client. As shown in FIG. 1 and FIG. 2, the video surveillance method includes the following steps.

101. A client obtains an intelligent analysis alarm and moving track information of at least one alarm triggering object, and adjusts a window layout of a user interface according to the intelligent analysis alarm.

The intelligent analysis alarm is triggered by the client, a surveillance platform, or a camera when determining that there is an intrusion object in a surveillance scene according to an intelligent analysis strategy. The intelligent analysis strategy includes but is not limited to four strategies: a perimeter intrusion detection strategy, a tripwire detection strategy, a loitering detection strategy, and a presence detection strategy, and is described herein by way of example only.

Optionally, before step 101 in this embodiment of the present disclosure is implemented, a user needs to set, in the client, a proper window layout (such as a "4+1" window layout, where a specific layout includes a big pane at the top and four small panes of a same size at the bottom, the four small panes being used for daily scene surveillance and the top big pane being used to track an alarm triggering object when there is a perimeter intrusion alarm (that is, an intelligent analysis alarm), such that the user can compare an image of the entire surveillance scene and an image of tracking a moving object at a short distance, to better know the situation of the surveillance scene, and can handle a moving intrusion object at any time. In addition, in a specific application, the user may also adjust the window layout at any time according to an actual application scenario. After the client obtains the intelligent analysis alarm, the client starts to adjust windows in the user interface to a proper layout, and frame the alarm triggering object that triggers the intelligent analysis alarm using a rectangular frame, such that subsequently the client performs local magnification on the alarm triggering object framed by the rectangular frame.

The intelligent analysis alarm may be an alarm triggered by the client when determining through intelligent analysis that there is an intrusion object in the surveillance scene, or may be an alarm reported by the surveillance platform or the camera when determining through intelligent analysis that there is an intrusion object in the surveillance scene.

Optionally, when the intelligent analysis alarm is triggered by the client when determining that there is an intrusion object in the surveillance scene according to the intelligent analysis strategy, where the intelligent analysis strategy is configured by the user, step 101 includes the following steps.

101a1. When determining that there is an intrusion object in the surveillance scene according to the intelligent analysis strategy configured by the user, the client triggers the intelligent analysis alarm and records the moving track information of the at least one alarm triggering object.

101a2. The client adjusts the window layout of the user interface according to the intelligent analysis alarm.

The client first decodes an audio-video stream sent through the surveillance platform by the camera to obtain a real-time video image, and then performs an intelligent analysis according to the intelligent analysis strategy and based on the real-time video image obtained after the decoding. If an intelligent alarm is triggered (that is, when there is a moving intrusion object within a range of the surveillance scene of the camera), an intelligent analysis alarm is generated. Then, the client adjusts the windows in the user interface to a proper layout according to the intelligent analysis alarm, and performs local magnification on the alarm triggering object that triggers the intelligent analysis alarm.

Optionally, when the intelligent analysis alarm is triggered by the surveillance platform when determining that there is an intrusion object in the surveillance scene according to the intelligent analysis strategy, where the intelligent analysis strategy may be configured by the user for the surveillance platform, or may be configured by the user for the client and then configured by the client for the surveillance platform. Step 101 includes the following steps.

101b1. The client receives the intelligent analysis alarm that is reported by the surveillance platform when determining that there is an intrusion object in the surveillance scene according to the intelligent analysis strategy configured by the user.

101b2. The client receives the moving track information of the at least one alarm triggering object that is obtained by the surveillance platform after generating the intelligent analysis alarm.

101b3. The client adjusts the window layout of the user interface according to the intelligent analysis alarm.

The surveillance platform decodes an audio-video stream sent by the camera to obtain a real-time video image, and then performs an intelligent analysis according to the intelligent analysis strategy and based on the real-time video image obtained after the decoding. If an intelligent alarm is triggered (that is, when there is a moving intrusion object within a range of the surveillance scene of the camera), an intelligent analysis alarm is generated, moving track information of at least one alarm triggering object is recorded, and the intelligent analysis alarm and the moving track information of the at least one alarm triggering object are reported to the client together or separately. Finally, the client adjusts the windows in the user interface to a proper layout according to the received intelligent analysis alarm, and performs local magnification on the alarm triggering object that triggers the intelligent analysis alarm.

Optionally, when the intelligent analysis alarm is generated by the camera when determining that there is an intrusion object in the surveillance scene according to the intelligent analysis strategy, where the intelligent analysis strategy may be configured for the camera by the user, or may be configured by the user for the client and then configured by the client for the surveillance platform and finally configured for the camera using the surveillance platform. A specific process is the same as the foregoing process during which the surveillance platform performs an intelligent analysis, and the details are not described herein again.

However, it should be noted that when the camera performs an intelligent analysis, the camera can only be a network camera; and if the camera does not perform an intelligent analysis and is only used to capture a video image, that is, short-distance tracking of a moving object in the surveillance scene can be implemented by deploying only one camera in the surveillance scene, thereby reducing costs. The camera may be a network camera or an analog camera.

102. The client performs local magnification on the at least one alarm triggering object according to moving track information of the at least one alarm triggering object.

Optionally, as shown in FIG. 2, step 102 includes the following steps.

102a. The client obtains position information of the at least one alarm triggering object from the moving track information of the at least one alarm triggering object.

Upon obtaining the intelligent analysis alarm, the client enables an alarm-triggering-object tracking function, and accordingly, the moving track information of the at least one alarm triggering object is obtained by the camera by real-time tracking. The client extracts the position information of the alarm triggering object from the moving track information of the at least one alarm triggering object. A position of the alarm triggering object can be represented using a rectangular frame in a small window of the client.

102b. The client obtains a current real-time image, and matches the real-time image with the position information of the at least one alarm triggering object, to find a position of the at least one alarm triggering object in the real-time image.

The client receives an audio-video stream sent through the surveillance platform by the camera, parses the audio-video stream to display a real-time image corresponding to the audio-video stream, and matches the real-time image with the position information of the at least one alarm triggering object, to find the position of the at least one alarm triggering object in the real-time image.

102c. The client performs local magnification on the at least one alarm triggering object using the position of the at least one alarm triggering object in the real-time image as a center.

Optionally, after step 102, the method further includes the following steps.

103a. Continuously obtain the moving track information of the at least one alarm triggering object after the at least one alarm triggering object moves.

103b. The client performs local magnification on the at least one alarm triggering object according to the moving track information of the at least one alarm triggering object, such that the at least one alarm triggering object is always displayed in the center of a video picture of a corresponding window in the user interface.

The client decodes an audio-video stream reported by the camera itself or reported by the camera through the surveillance platform to obtain a real-time video image, and then compares the position information of the at least one alarm triggering object with the real-time video image, to find the position of the at least one alarm triggering object in the real-time video image, to perform local magnification using the position of the at least one alarm triggering object in the real-time video image as a center. If a "4+1" window layout is used, a position of an alarm triggering object in a small pane can be represented by a rectangular frame, such that details around a moving object can be seen clearly; and the image in the rectangular frame is magnified and displayed in the big pane at the top for ease of viewing. After the object moves, the client continuously obtains the moving track information of the moving object, such that the client can continuously perform local magnification using the moving object as a center and display the locally magnified image in the big pane at the top. In this way, the moving object is always displayed in the center of the picture and the user can continue to view the entire surveillance scene according to videos in the bottom panes.

In addition, if multiple alarm triggering objects are detected in the surveillance scene, the client obtains or receives moving track information of the multiple triggering objects that is reported by the surveillance platform or the camera, and uses multiple panes to simultaneously display images that are magnified locally using the alarm triggering objects as centers.

In the video surveillance method provided in this embodiment of the present disclosure, a client adjusts, according to an intelligent analysis alarm triggered by the client itself, a surveillance platform, or a camera when determining that there is an intrusion object in a surveillance scene according to an intelligent analysis strategy, a window layout of a user interface, and obtains moving track information of at least one alarm triggering object, to perform local magnification on the at least one alarm triggering object according to moving track information of the at least one alarm triggering object. In the present disclosure, only one camera needs to be deployed, thereby avoiding cost waste caused by deploying two cameras, and improving efficiency of local magnification on an alarm triggering object.

Figure 3:
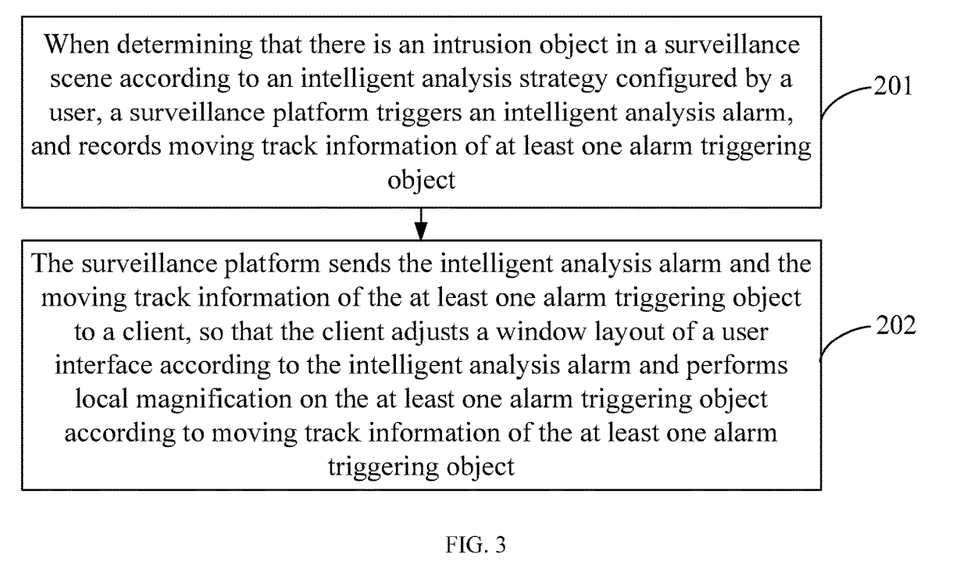
FIG. 3 is a schematic flowchart of a video surveillance method on a surveillance platform side according to an embodiment of the present disclosure.

An embodiment of the present disclosure provides a video surveillance method on a surveillance platform side. As shown in FIG. 3, the video surveillance method includes the following steps.

201. When determining that there is an intrusion object in a surveillance scene according to an intelligent analysis strategy configured by a user, a surveillance platform triggers an intelligent analysis alarm, and records moving track information of at least one alarm triggering object.

The intelligent analysis strategy includes but is not limited to four strategies: a perimeter intrusion detection strategy, a tripwire detection strategy, a loitering detection strategy, and a presence detection strategy, and is described herein by way of example only. The intelligent analysis strategy may be configured by the user for the surveillance platform, or may be configured by the user for the client and then configured by the client for the surveillance platform.

202. The surveillance platform sends the intelligent analysis alarm and the moving track information of the at least one alarm triggering object to a client, such that the client adjusts a window layout of a user interface according to the intelligent analysis alarm and performs local magnification on the at least one alarm triggering object according to moving track information of the at least one alarm triggering object.

In the video surveillance method provided in this embodiment of the present disclosure, a surveillance platform sends, to a client, an intelligent analysis alarm that is triggered and moving track information of at least one alarm triggering object that is recorded when the surveillance platform determines that there is an intrusion object in a surveillance scene according to an intelligent analysis strategy, such that the client adjusts a window layout of a user interface according to the intelligent analysis alarm and performs local magnification on the at least one alarm triggering object according to moving track information of the at least one alarm triggering object. In the present disclosure, only one camera needs to be deployed, thereby avoiding cost waste caused by deploying two cameras, and improving efficiency of local magnification on an alarm triggering object.

Figure 4:
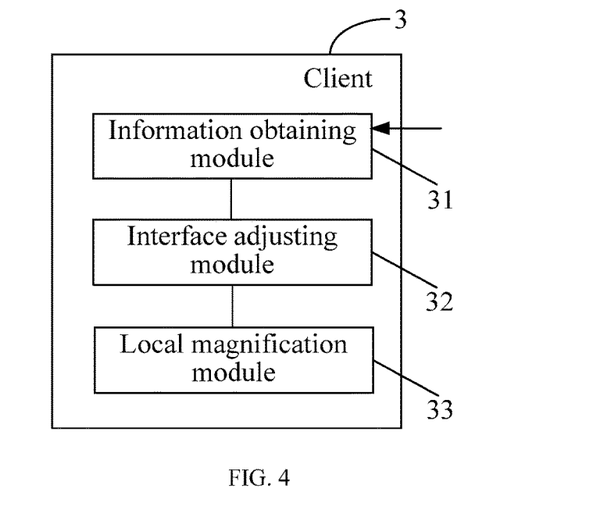
FIG. 4 is a schematic structural diagram of a client according to an embodiment of the present disclosure.
Figure 5:
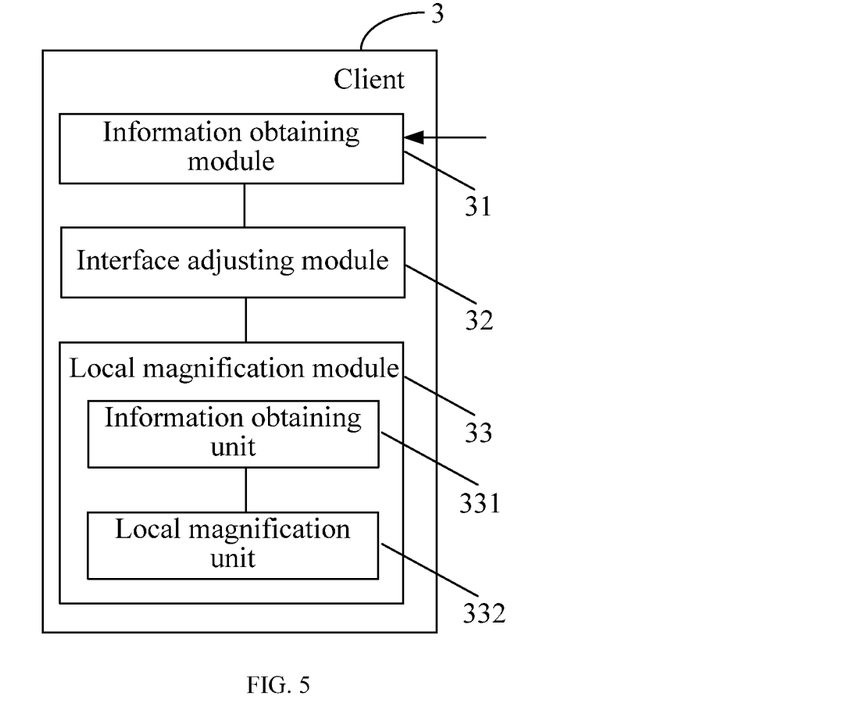
FIG. 5 is a schematic structural diagram of another client according to an embodiment of the present disclosure.

An embodiment of the present disclosure provides a client. As shown in FIG. 4 and FIG. 5, the client is used to implement the foregoing video surveillance methods, and the client 3 includes an information obtaining module 31, an interface adjusting module 32, and a local magnification module 33.

The information obtaining module 31 is configured to obtain an intelligent analysis alarm and moving track information of at least one alarm triggering object, where the intelligent analysis alarm is triggered by the client, a surveillance platform, or a camera when determining that there is an intrusion object in a surveillance scene according to an intelligent analysis strategy.

The interface adjusting module 32 is configured to adjust a window layout of a user interface according to the intelligent analysis alarm obtained by the information obtaining module 31.

The local magnification module 33 is configured to perform local magnification on the at least one alarm triggering object according to moving track information of the at least one alarm triggering object that is obtained by the information obtaining module 31.

Optionally, the information obtaining module 31 is further configured to continuously obtain the moving track information of the at least one alarm triggering object after the at least one alarm triggering object moves.

The local magnification module 33 is further configured to perform local magnification on the at least one alarm triggering object according to the moving track information of the at least one alarm triggering object that is obtained by the information obtaining module 31, such that the at least one alarm triggering object is always displayed in the center of a video picture of a corresponding window in the user interface.

Optionally, as shown in FIG. 5, the local magnification module 33 includes an information obtaining unit 331 and a local magnification unit 332.

The information obtaining unit 331 is configured to obtain position information of the at least one alarm triggering object from the moving track information of the at least one alarm triggering object.

The information obtaining unit 331 is further configured to obtain a current real-time image, and match the real-time image with the position information of the at least one alarm triggering object, to find a position of the at least one alarm triggering object in the real-time image.

The local magnification unit 332 is configured to perform local magnification on the at least one alarm triggering object using the position of the at least one alarm triggering object in the real-time image as a center.

Optionally, when the intelligent analysis alarm is triggered by the client when determining that there is an intrusion object in the surveillance scene according to the intelligent analysis strategy, the information obtaining module 31 is configured to, when it is determined that there is an intrusion object in the surveillance scene according to an intelligent analysis strategy configured by a user, trigger the intelligent analysis alarm and record the moving track information of the at least one alarm triggering object, such that the interface adjusting module 32 adjusts the window layout of the user interface according to the intelligent analysis alarm.

Optionally, when the intelligent analysis alarm is triggered by the surveillance platform when determining that there is an intrusion object in the surveillance scene according to the intelligent analysis strategy, the information obtaining module 31 is configured to receive the intelligent analysis alarm that is reported by the surveillance platform when determining that there is an intrusion object in the surveillance scene according to an intelligent analysis strategy configured by a user; and receive the moving track information of the at least one alarm triggering object that is obtained by the surveillance platform after generating the intelligent analysis alarm, such that the interface adjusting module 32 adjusts the window layout of the user interface according to the intelligent analysis alarm.

The client provided in this embodiment of the present disclosure adjusts, according to an intelligent analysis alarm triggered by the client itself, a surveillance platform, or a camera when determining that there is an intrusion object in a surveillance scene according to an intelligent analysis strategy, a window layout of a user interface, and obtains moving track information of at least one alarm triggering object, to perform local magnification on the at least one alarm triggering object according to moving track information of the at least one alarm triggering object. In the present disclosure, only one camera needs to be deployed, thereby avoiding cost waste caused by deploying two cameras, and improving efficiency of local magnification on an alarm triggering object.

Figure 6:
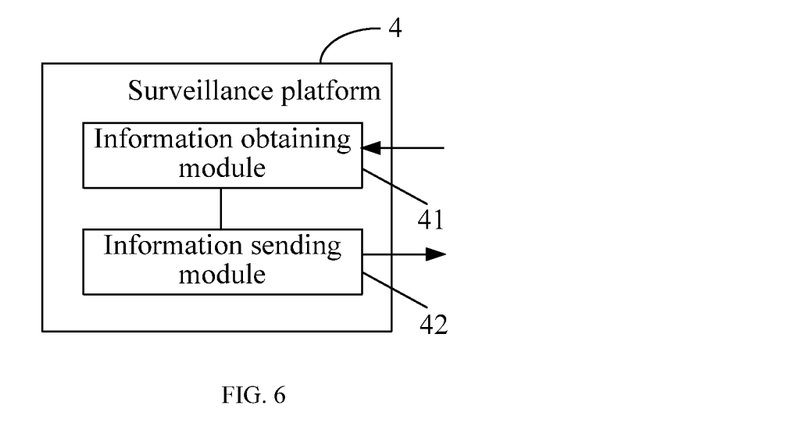
FIG. 6 is a schematic structural diagram of a surveillance platform according to an embodiment of the present disclosure.

An embodiment of the present disclosure provides a surveillance platform. As shown in FIG. 6, the surveillance platform is used to implement the foregoing video surveillance methods, and the surveillance platform 4 includes an information obtaining module 41 and an information sending module 42.

The information obtaining module 41 is configured to, when it is determined that there is an intrusion object in a surveillance scene according to an intelligent analysis strategy configured by a user, trigger an intelligent analysis alarm, and record moving track information of at least one alarm triggering object.

The information sending module 42 is configured to send, to a client, the intelligent analysis alarm and the moving track information of the at least one alarm triggering object that are obtained by the information obtaining module 41, such that the client adjusts a window layout of a user interface according to the intelligent analysis alarm and performs local magnification on the at least one alarm triggering object according to moving track information of the at least one alarm triggering object.

The surveillance platform provided in this embodiment of the present disclosure sends, to a client, an intelligent analysis alarm that is triggered and moving track information of at least one alarm triggering object that is recorded when the surveillance platform determines that there is an intrusion object in a surveillance scene according to an intelligent analysis strategy, such that the client adjusts a window layout of a user interface according to the intelligent analysis alarm and performs local magnification on the at least one alarm triggering object according to moving track information of the at least one alarm triggering object. In the present disclosure, only one camera needs to be deployed, thereby avoiding cost waste caused by deploying two cameras, and improving efficiency of local magnification on an alarm triggering object.

Figure 7:
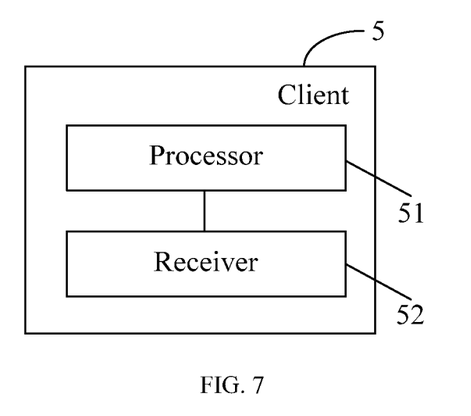
FIG. 7 is a schematic structural diagram of a client according to another embodiment of the present disclosure.

An embodiment of the present disclosure provides a client. As shown in FIG. 7, the client 5 includes a processor 51 and a receiver 52.

The processor 51 is configured to obtain an intelligent analysis alarm and moving track information of at least one alarm triggering object, and adjust a window layout of a user interface according to the intelligent analysis alarm, where the intelligent analysis alarm is triggered by the client, a surveillance platform, or a camera when determining that there is an intrusion object in a surveillance scene according to an intelligent analysis strategy.

The processor 51 is further configured to perform local magnification on the at least one alarm triggering object according to moving track information of the at least one alarm triggering object.

Optionally, the processor 51 is further configured to continuously obtain the moving track information of the at least one alarm triggering object after the at least one alarm triggering object moves; and configured to perform local magnification on the at least one alarm triggering object according to the moving track information of the at least one alarm triggering object, such that the at least one alarm triggering object is always displayed in the center of a video picture of a corresponding window in the user interface.

Optionally, the processor 51 is configured to obtain position information of the at least one alarm triggering object from the moving track information of the at least one alarm triggering object; obtain a current real-time image, and match the real-time image with the position information of the at least one alarm triggering object, to find a position of the at least one alarm triggering object in the real-time image; and perform local magnification on the at least one alarm triggering object using the position of the at least one alarm triggering object in the real-time image as a center.

Optionally, when the intelligent analysis alarm is triggered by the client when determining that there is an intrusion object in the surveillance scene according to the intelligent analysis strategy, the processor 51 is further configured to, when it is determined that there is an intrusion object in the surveillance scene according to an intelligent analysis strategy configured by a user, trigger the intelligent analysis alarm, and record the moving track information of the at least one alarm triggering object.

The processor 51 is further configured to adjust the window layout of the user interface according to the intelligent analysis alarm.

Optionally, when the intelligent analysis alarm is triggered by the surveillance platform when determining that there is an intrusion object in the surveillance scene according to the intelligent analysis strategy, the receiver 52 is configured to receive the intelligent analysis alarm that is reported by the surveillance platform when determining that there is an intrusion object in the surveillance scene according to an intelligent analysis strategy configured by a user.

The receiver 52 is further configured to receive the moving track information of the at least one alarm triggering object that is obtained by the surveillance platform after generating the intelligent analysis alarm.

The processor 51 is further configured to adjust the window layout of the user interface according to the intelligent analysis alarm.

The client provided in this embodiment of the present disclosure adjusts, according to an intelligent analysis alarm triggered by the client itself, a surveillance platform, or a camera when determining that there is an intrusion object in a surveillance scene according to an intelligent analysis strategy, a window layout of a user interface, and obtains moving track information of at least one alarm triggering object, to perform local magnification on the at least one alarm triggering object according to moving track information of the at least one alarm triggering object. In the present disclosure, only one camera needs to be deployed, thereby avoiding cost waste caused by deploying two cameras, and improving efficiency of local magnification on an alarm triggering object.

Figure 8:
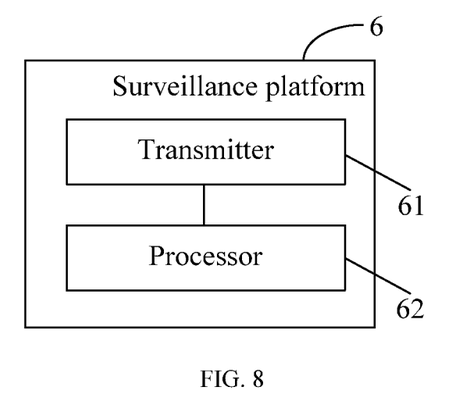
FIG. 8 is a schematic structural diagram of a surveillance platform according to another embodiment of the present disclosure.

An embodiment of the present disclosure provides a surveillance platform. As shown in FIG. 8, the surveillance platform 6 includes a transmitter 61 and a processor 62.

The processor 62 is configured to, when it is determined that there is an intrusion object in a surveillance scene according to an intelligent analysis strategy configured by a user, trigger an intelligent analysis alarm, and record moving track information of at least one alarm triggering object.

The transmitter 61 is configured to send the intelligent analysis alarm and the moving track information of the at least one alarm triggering object to a client, such that the client adjusts a window layout of a user interface according to the intelligent analysis alarm and performs local magnification on the at least one alarm triggering object according to moving track information of the at least one alarm triggering object.

The surveillance platform provided in this embodiment of the present disclosure sends, to a client, an intelligent analysis alarm that is triggered and moving track information of at least one alarm triggering object that is recorded when the surveillance platform determines that there is an intrusion object in a surveillance scene according to an intelligent analysis strategy, such that the client adjusts a window layout of a user interface according to the intelligent analysis alarm and performs local magnification on the at least one alarm triggering object according to moving track information of the at least one alarm triggering object. In the present disclosure, only one camera needs to be deployed, thereby avoiding cost waste caused by deploying two cameras, and improving efficiency of local magnification on an alarm triggering object.

Figure 9:
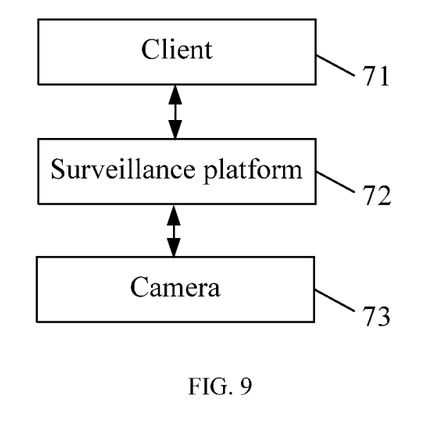
FIG. 9 is a schematic diagram of a video surveillance system according to an embodiment of the present disclosure.

An embodiment of the present disclosure provides a video surveillance system. As shown in FIG. 9, the video surveillance system 7 includes a client 71, a surveillance platform 72, and a camera 73. The client 71 is any one of the foregoing clients, the surveillance platform 72 is any one of the foregoing surveillance platforms, and the camera 73 is any one of the foregoing cameras.

The video surveillance system is divided into three parts: a client, a surveillance platform, and a camera. However, in a specific implementation, the client and the surveillance platform may be integrated.

In the video surveillance system provided in this embodiment of the present disclosure, the client adjusts, according to an intelligent analysis alarm triggered by the client itself, the surveillance platform, or the camera when determining that there is an intrusion object in a surveillance scene according to an intelligent analysis strategy, a window layout of a user interface, and obtains moving track information of at least one alarm triggering object, to perform local magnification on the at least one alarm triggering object according to moving track information of the at least one alarm triggering object. In the present disclosure, only one camera needs to be deployed, thereby avoiding cost waste caused by deploying two cameras, and improving efficiency of local magnification on an alarm triggering object.

A person of ordinary skill in the art may understand that all or some of the steps of the foregoing method embodiments may be implemented by a program instructing relevant hardware. The foregoing program may be stored in a computer readable storage medium. When the program runs, the steps of the foregoing method embodiments are performed. The foregoing storage medium includes any medium that can store program code, such as a read-only memory (ROM), a random access memory (RAM), a magnetic disk, or an optical disc.

The foregoing descriptions are merely implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A video surveillance method, comprising:
   obtaining, by a client, an intelligent analysis alarm and moving track information of at least one alarm triggering object;
   adjusting a window layout of a user interface according to the intelligent analysis alarm, wherein the intelligent analysis alarm is triggered by at least one of the client, a surveillance platform, or a single camera when determining that there is an intrusion object in a surveillance scene according to an intelligent analysis strategy, and wherein the intelligent analysis strategy only uses video from the single camera to determine that there is the intrusion object in the surveillance scene;
   performing, by the client, local magnification on the at least one alarm triggering object according to moving track information of the at least one alarm triggering object, wherein the local magnification is performed by obtaining a current real-time image of the video from the single camera and using a position of the at least one alarm triggering object in the current real-time image of the video from the single camera as a center of the local magnification;
   detecting a second alarm triggering object simultaneously with the at least one alarm triggering object in the surveillance scene using the video from the single camera; and
   generating multiple panes to simultaneously display images that are magnified locally using the at least one alarm triggering object and the second alarm triggering object as centers of the multiple panes.

2. The video surveillance method of claim 1, further comprising:
   obtaining continuously, by the client, the moving track information of the at least one alarm triggering object after the at least one alarm triggering object moves; and
   performing, by the client, local magnification on the at least one alarm triggering object according to the moving track information of the at least one alarm triggering object, such that the at least one alarm triggering object is always displayed in the center of a video picture of a corresponding window in the user interface.

3. The video surveillance method of claim 2, wherein performing, by the client, the local magnification on the at least one alarm triggering object according to moving track information of the at least one alarm triggering object comprises:
   obtaining, by the client, position information of the at least one alarm triggering object from the moving track information of the at least one alarm triggering object;
   obtaining, by the client, a current real-time image, and matching the real-time image with the position information of the at least one alarm triggering object; to find a position of the at least one alarm triggering object in the real-time image; and
   performing, by the client, local magnification on the at least one alarm triggering object using the position of the at least one alarm triggering object in the real-time image as a center.

4. The video surveillance method of claim 1, wherein when the intelligent analysis alarm is triggered by the client when determining that there is the intrusion object in the surveillance scene according to the intelligent analysis strategy, obtaining, by the client, the intelligent analysis alarm and moving track information of at least one alarm triggering object, and adjusting the window layout of the user interface according to the intelligent analysis alarm comprises:
   triggering, by the client, the intelligent analysis alarm when determining that there is the intrusion object in the surveillance scene according to the intelligent analysis strategy that is configured by a user, and recording the moving track information of the at least one alarm triggering object; and
   adjusting, by the client, the window layout of the user interface according to the intelligent analysis alarm.

5. The video surveillance method of claim 1, wherein when the intelligent analysis alarm is triggered by the surveillance platform when determining that there is the intrusion object in the surveillance scene according to the intelligent analysis strategy, obtaining, by the client, the intelligent analysis alarm and moving track information of at least one alarm triggering object, and adjusting the window layout of the user interface according to the intelligent analysis alarm comprises:
   receiving, by the client, the intelligent analysis alarm that is reported by the surveillance platform when determining that there is the intrusion object in the surveillance scene according to the intelligent analysis strategy that is configured by a user;
   receiving, by the client, the moving track information of the at least one alarm triggering object that is obtained by the surveillance platform after generating the intelligent analysis alarm; and adjusting, by the client, the window layout of the user interface according to the intelligent analysis alarm.

6. The video surveillance method of claim 1, wherein the intelligent analysis strategy comprises a perimeter intrusion detection strategy, a tripwire detection strategy, a loitering detection strategy, and a presence detection strategy.

7. The video surveillance method of claim 1, wherein the single camera is a fixed box camera, and wherein no other camera is used in the method.

8. A client, comprising:
a memory comprising instructions; and
a processor coupled to the memory, wherein the instructions cause the processor to be configured to:
obtain an intelligent analysis alarm and moving track information of at least one alarm triggering object, wherein the intelligent analysis alarm is triggered by at least one of the client, a surveillance platform, or a single camera when determining that there is an intrusion object in a surveillance scene according to an intelligent analysis strategy, and wherein the intelligent analysis strategy only uses video from the single camera to determine that there is the intrusion object in the surveillance scene;
adjust a window layout of a user interface according to the intelligent analysis alarm;
perform local magnification on the at least one alarm triggering object according to moving track information of the at least one alarm triggering object, wherein the local magnification is performed by obtaining a current real-time image of the video from the single camera and using a position of the at least one alarm triggering object in the current real-time image of the video from the single camera as a center of the local magnification;
detect a second alarm triggering object simultaneously with the at least one alarm triggering object in the surveillance scene using the video from the single camera; and
generate multiple panes to simultaneously display images that are magnified locally using the at least one alarm triggering object and the second alarm triggering object as centers of the multiple panes.

9. The client of claim 8, wherein the instructions further cause the processor to be configured to:
continuously obtain the moving track information of the at least one alarm triggering object after the at least one alarm triggering object moves; and
perform local magnification on the at least one alarm triggering object according to the moving track information of the at least one alarm triggering object, such that the at least one alarm triggering object is always displayed in the center of a video picture of a corresponding window in the user interface.

10. The client of claim 9, wherein the instructions further cause the processor to be configured to:
obtain position information of the at least one alarm triggering object from the moving track information of the at least one alarm triggering object;
obtain a current real-time image;
match the real-time image with the position information of the at least one alarm triggering object to find a position of the at least one alarm triggering object in the real-time image; and
perform local magnification on the at least one alarm triggering object using the position of the at least one alarm triggering object in the real-time image as a center.

11. The client of claim 8, wherein when the intelligent analysis alarm is triggered by the client when determining that there is the intrusion object in the surveillance scene according to the intelligent analysis strategy; the instructions further cause the processor to be configured to trigger the intelligent analysis alarm and record the moving track information of the at least one alarm triggering object when there is the intrusion object in the surveillance scene according to the intelligent analysis strategy that is configured by a user, such that the processor adjusts the window layout of the user interface according to the intelligent analysis alarm.

12. The client of claim 8, wherein when the intelligent analysis alarm is triggered by the surveillance platform when determining that there is the intrusion object in the surveillance scene according to the intelligent analysis strategy, the instructions further cause the processor to be configured to:
receive the intelligent analysis alarm that is reported by the surveillance platform when determining that there is the intrusion object in the surveillance scene according to the intelligent analysis strategy that is configured by a user; and
receive the moving track information of the at least one alarm triggering object that is obtained by the surveillance platform after generating the intelligent analysis alarm, such that the processor adjusts the window layout of the user interface according to the intelligent analysis alarm.

13. The client of claim 8, wherein the intelligent analysis strategy comprises a perimeter intrusion detection strategy, a tripwire detection strategy, a loitering detection strategy, and a presence detection strategy.

14. The client of claim 8, wherein the single camera is a fixed box camera, and wherein the client is not coupled to any other cameras.

15. A video surveillance system, comprising:
a surveillance platform;
a single camera coupled to surveillance platform; and
a client coupled to the surveillance platform and configured to:
obtain an intelligent analysis alarm and moving track information of at least one alarm triggering object, wherein the intelligent analysis alarm is triggered by at least one of the client, the surveillance platform, or the single camera when determining that there is an intrusion object in a surveillance scene according to an intelligent analysis strategy, and wherein the intelligent analysis strategy only uses video from the single camera to determine that there is the intrusion object in the surveillance scene;
adjust a window layout of a user interface according to the intelligent analysis alarm;
perform local magnification on the at least one alarm triggering object according to moving track information of the at least one alarm triggering object, wherein the local magnification is performed by obtaining a current real-time image of the video from the single camera and using a position of the at least one alarm triggering object in the current real-time image of the video from the single camera as a center of the local magnification;
detect a second alarm triggering object simultaneously with the at least one alarm triggering object in the surveillance scene using the video from the single camera; and
generate multiple panes to simultaneously display images that are magnified locally using the at least one alarm triggering object and the second alarm triggering object as centers of the multiple panes, and wherein the surveillance platform is configured to;

trigger the intelligent analysis alarm when it is determined that there is the intrusion object in the surveillance scene according to the intelligent analysis strategy that is configured by the user;

record moving track information of at least one alarm triggering object when it is determined that there is the intrusion object in the surveillance scene according to the intelligent analysis strategy that is configured by the user; and send, to the client, the intelligent analysis alarm and the moving track information of the at least one alarm triggering object, such that the client adjusts the window layout of the user interface according to the intelligent analysis alarm and performs local magnification on the at least one alarm triggering object according to moving track information of the at least one alarm triggering object.

16. The video surveillance system of claim 15, wherein the client is further configured to:

continuously obtain the moving track information of the at least one alarm triggering object after the at least one alarm triggering object moves; and perform local magnification on the at least one alarm triggering object according to the moving track information of the at least one alarm triggering object, such that the at least one alarm triggering object is always displayed in the center of a video picture of a corresponding window in the user interface.

17. The video surveillance system of claim 16, wherein the client is further configured to:

obtain position information of the at least one alarm triggering object from the moving track information of the at least one alarm triggering object;

obtain a current real-time image;

match the real-time image with the position information of the at least one alarm triggering object to find a position of the at least one alarm triggering object in the real-time image; and perform local magnification on the at least one alarm triggering object using the position of the at least one alarm triggering object in the real-time image as a center.

18. The video surveillance system of claim 15, wherein when the intelligent analysis alarm is triggered by the client when determining that there is the intrusion object in the surveillance scene according to the intelligent analysis strategy, the client is further configured to trigger the intelligent analysis alarm and record the moving track information of the at least one alarm triggering object when it is determined that there is the intrusion object in the surveillance scene according to the intelligent analysis strategy that is configured by the user, such that the client adjusts the window layout of the user interface according to the intelligent analysis alarm.

19. The video surveillance system of claim 15, wherein when the intelligent analysis alarm is triggered by the surveillance platform when determining that there is the intrusion object in the surveillance scene according to the intelligent analysis strategy, the surveillance platform is further configured to:

receive the intelligent analysis alarm that is reported by the surveillance platform when determining that there is the intrusion object in the surveillance scene according to the intelligent analysis strategy; and receive the moving track information of the at least one alarm triggering object that is obtained by the surveillance platform after generating the intelligent analysis alarm, such that the client adjusts the window layout of the user interface according to the intelligent analysis alarm.

20. The video surveillance system of claim 15, wherein the intelligent analysis strategy comprises a perimeter intrusion detection strategy, a tripwire detection strategy, a loitering detection strategy, and a presence detection strategy.

* * * * *